Oct. 9, 1962 C. J. KNERR ETAL 3,057,218
DRIVE ASSEMBLY
Filed Feb. 19, 1960 4 Sheets-Sheet 2
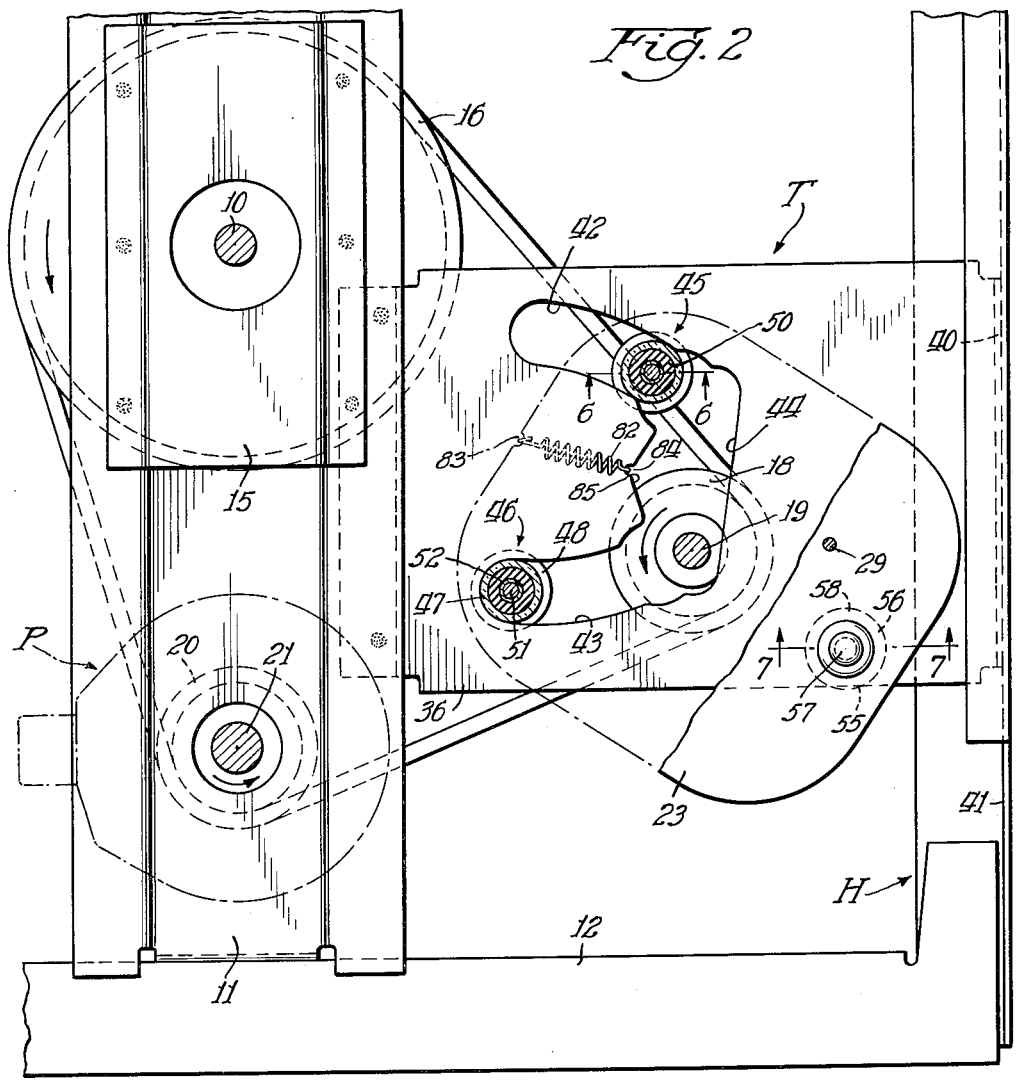
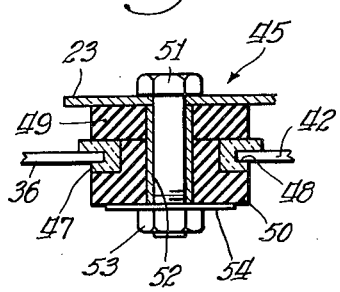
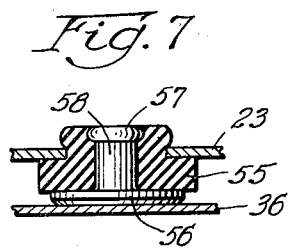
Inventors:
Carl J. Knerr and
Charles R. Waldrop
By H. J. Schmid Atty.

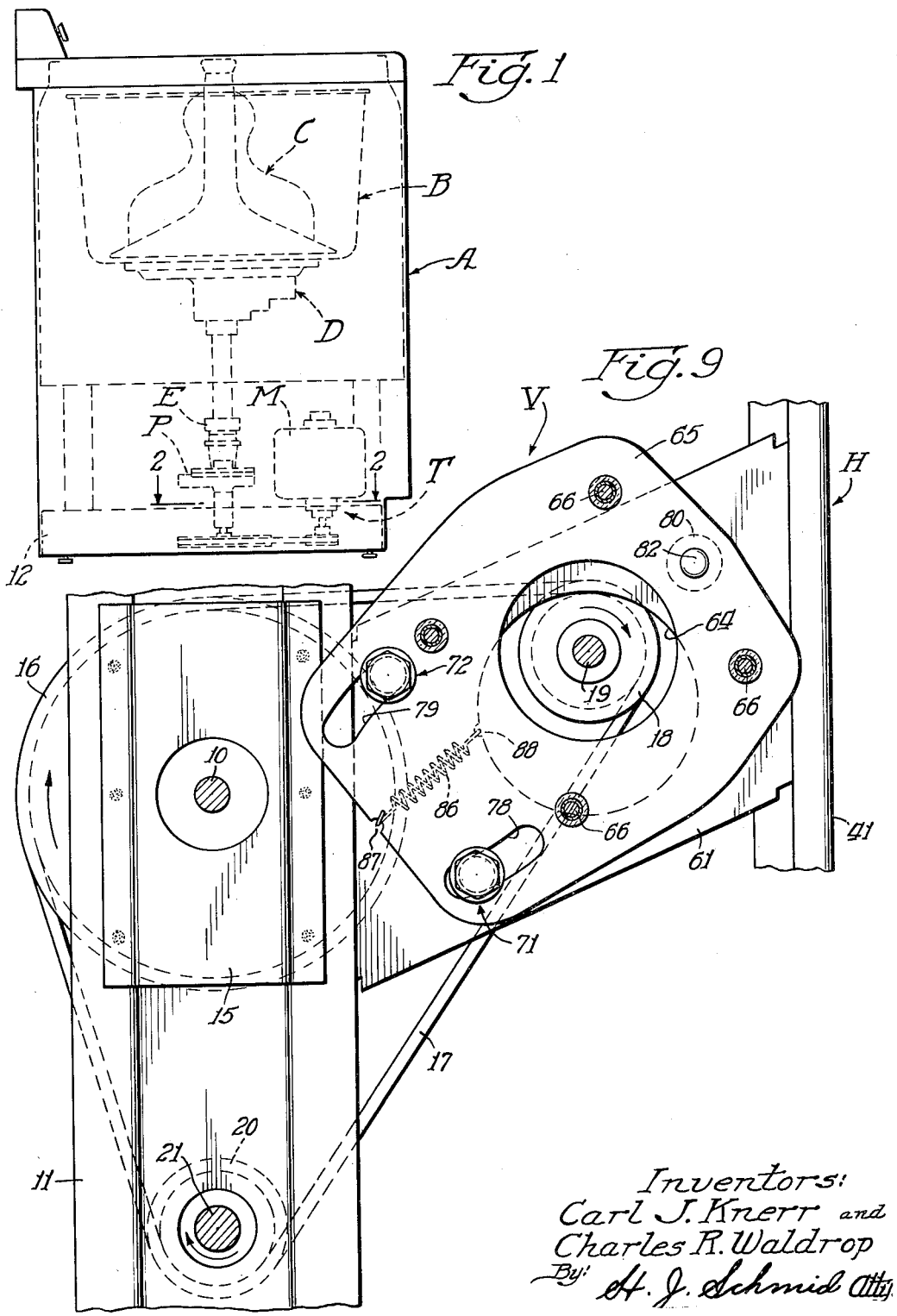

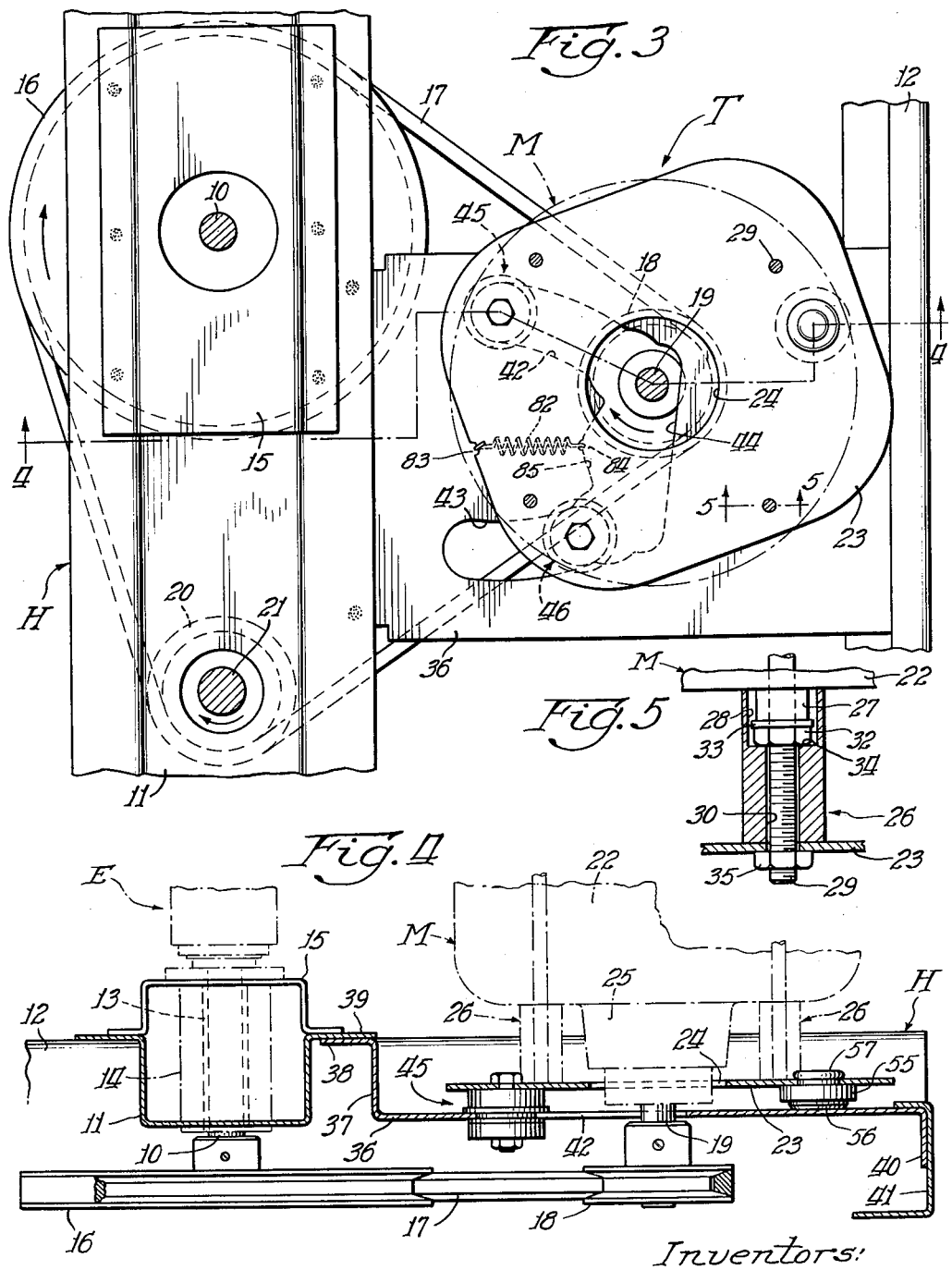

Oct. 9, 1962 C. J. KNERR ETAL 3,057,218
DRIVE ASSEMBLY
Filed Feb. 19, 1960 4 Sheets-Sheet 4
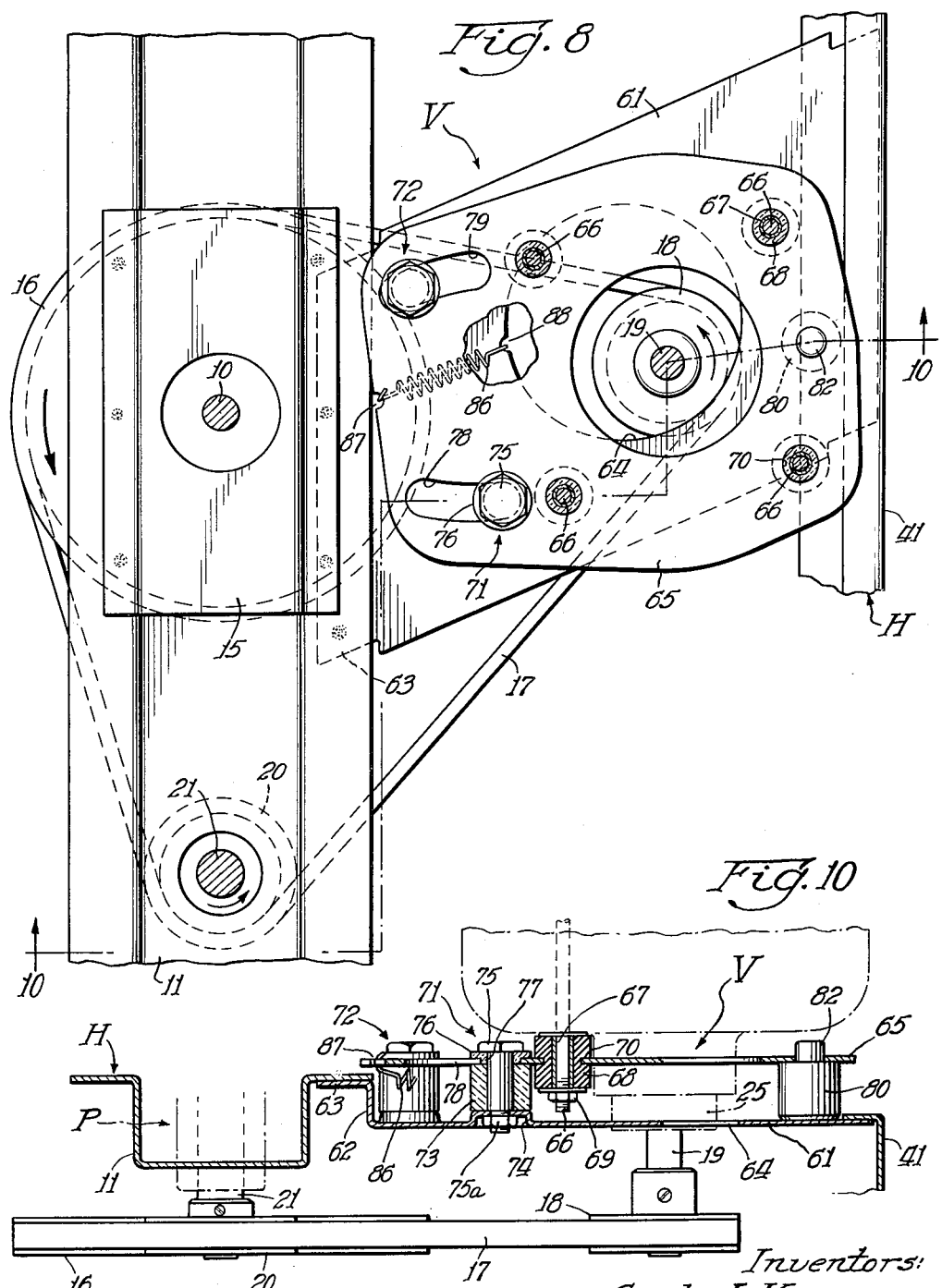
Inventors:
Carl J. Knerr and
Charles R. Waldrop
By: H. J. Schmid Atty.

United States Patent Office 3,057,218
Patented Oct. 9, 1962

3,057,218
DRIVE ASSEMBLY
Carl J. Knerr and Charles R. Waldrop, Herrin, Ill., assignors to Borg-Warner Corporation, Chicago, Ill., a corporation of Illinois
Filed Feb. 19, 1960, Ser. No. 9,741
14 Claims. (Cl. 74—242.9)

This invention relates to a drive assembly and more particularly to a drive assembly for use with a reversible drive shaft of a power unit.

An object of the invention is to provide an improved drive assembly of the belt and pulley type for use with a reversible drive shaft of a power unit.

Another object of the invention is to provide an improved drive assembly of the belt and pulley type for machines employing a reversible drive shaft and which is effective to automatically provide proper belt tension during either direction of rotation of the drive shaft.

Another object of the invention is to provide an improved drive assembly of the belt and pulley type as described wherein belt tension is automatically compensated in direct proportion to the load on the power unit.

Another object of the invention is to provide an improved drive assembly of the belt and pulley type characterized by a power unit pivotally movable, during rotation reversal transition of its drive shaft, to predetermined positions in which belt tension is automatically compensated in direct proportion to the load on the power unit.

A further feature of the invention is to provide an improved drive assembly of the belt and pulley type as described in which the reversal of direction of rotation of the motor is effective to momentarily reduce the load on the motor to permit acceleration of the motor for taking up the load during the transition from one direction of rotation to the other direction of rotation of the motor.

A further object of the invention is to provide an improved drive assembly of the belt and pulley type as described and having means for completely unloading the bearings of the power unit drive shaft and a driven shaft of side thrust by completely removing belt tension, when the machine is idle.

The improved drive assembly of the present invention is particularly, but not necessarily, designed for use in a washing machine having a power unit, such as a motor and drive mechanism, for oscillating an agitator or for rotating a clothes basket by sequentially reversing the direction of rotation of the motor during machine operation and for operating a pump, the drive assembly being characterized by a belt in driving relation to pulleys of the motor, pump, and drive mechanism shafts, and pivotal mounting of the motor for movement, in a plane transverse to its axis of rotation, to either of two positions, dependent on the direction of rotation of the motor and, in which positions, the motor mounting is effective to provide automatic and variable belt tensioning, compensated in direct proportion to the motor load, to ensure continuous driving of the drive mechanism and pump pulleys by the belt, the improved drive assembly being further characterized by complete unloading of side thrusts on the motor, pump, and drive mechanism bearings and complete removal of tension on the belt when the machine is idle.

Other objects and advantages of the invention will hereinafter appear in the following details of the description having reference to the accompanying drawings forming a part of this specification.

In the drawings:

FIG. 1 is a side elevational view of a washing machine illustrating the relative disposition of the drive assembly embodying the features of the present invention;

FIGS. 2 and 3 are top plan views of the drive assembly taken on the line 2—2 of FIG. 1, looking in the direction of the arrows, and respectively illustrating the drive assembly motor in its two operating positions;

FIG. 4 is a sectional view of the motor drive assembly shown in FIGS. 1 and 2 and taken substantially on line 4—4 of FIG. 3;

FIG. 5 is a sectional view taken substantially along the line 5—5 of FIG. 3;

FIG. 6 is a sectional view taken substantially on the line 6—6 of FIG. 2;

FIG. 7 is a sectional view taken substantially along the line 7—7 of FIG. 2;

FIGS. 8 and 9 are top plan views of another embodiment of the drive assembly and respectively illustrating the drive assembly motor in its two operating positions;

FIG. 10 is a sectional view of the drive assembly shown in FIG. 8 and taken substantially on the line 10—10 of FIG. 8.

Referring now to the accompanying drawings in detail, and particularly to FIGS. 1 to 7 inclusive wherein the entire drive assembly with which the present invention is particularly concerned is designated in its entirety by the letter T and shown incorporated in a washing machine comprising, in general, the component part assemblies respectively indicated in their entirety by the letters as follows: A cabinet A exemplifying the external appearances of an automatic washing, rinsing and water extracting machine, as shown in FIG. 1 and being hereinafter referred to simply as a "washing machine"; a basket B of the centrifugal extracting type disposed within the cabinet A; an agitator C operatively disposed within the basket B; a transmission D, a housing of which forms a part of, and is carried, by the basket for rotation therewith when the basket is rotated for centrifugal water extracting operations and is adapted to impart an oscillatory motion to the agitator C; a drive mechanism E; a supporting structure H; and a reversible electric motor M to drivingly oscillate the agitator C and to rotate the basket B through its connection to the transmission D and drive mechanism E by the improved drive assembly of the belt and pulley type, rotation of the motor in one direction causing oscillation of the agitator for a washing operation and rotation of the motor in the opposite direction causing rotation of the basket for performing a water extracting operation upon the clothes. The washing machine and particularly the transmission D and drive mechanism E for accomplishing the described washing and water extracting operations are more particularly shown and described in U.S. Patent 2,807,951 issued October 1, 1957.

Also, as described in said U.S. patent, the supporting structure H comprises a base formed of structural angle members to define a substantially square-box like base with the lower portions of the cabinet A secured to and supported by certain angle members of the base. The base comprises a transversely extending structural steel support member 11 of U channel section as shown more particularly in FIGS. 2, 3, and 4 supported at opposite ends by structural steel parallel members of the base one of which is indicated at 12. A stub drive shaft 10 of the drive mechanism E is journalled in a sleeve bearing 13 disposed in the cylindrical bore of a hub 14, the lower portion of which is supported on the channel member 11 and the upper portion of the hub being supported by the bent plate support member 15 also carried by the transversely extending structural steel support member 11. It will be noted that, as the stub drive shaft 10 is rotatable in the sleeve bearings 13 and the hub 14 is fixed to the support members 11 and 15, the shaft will rotate on a fixed vertical axis. In operation, when the motor is rotated in one direction, the driving mechanism E is effective to oscillate the agitator for a washing operation and when the motor is rotated in the opposite direction the driving mechanism is effective to rotate the basket for water extraction operations.

The drive shaft 10 is rotated by a pulley 16 secured thereto and rotatable by a V-belt 17 in driving relation with a driving pulley 18 carried by the drive shaft 19 of the motor M. The belt 17 also extends about and engages a driven pulley 20 secured to the vertically extending shaft 21 of a pump P for disposal of the used wash water or rinse water after the washing operation and the water extraction operations of the washing machine. The pump P is mounted on the support member 11, to dispose its driven shaft 21 and pulley 20 in the horizontal plane of the pulleys 16 and 18 for effecting drive of the pump, the pump being mounted in fixed relation to the support member 11. All of the foregoing structural and operative parts of the washing machine heretofore referred to are shown and described in U.S. Patent 2,807,951 and reference should be made to this patent for a more complete and detailed description and showing of the washing machine.

The preferred embodiment of the improved drive assembly T, as shown in FIGS. 1 to 7 inclusive, is particularly adapted and designed to provide the advantageous feature that belt tension is automatically compensated in direct proportion to the motor load in either direction of rotation of the reversible motor, and having the further desirable feature that all bearings for the driven shafts 10 and 21 and drive shaft 19 of the electric motor are completely unloaded of side thrust and the belt tension is completely removed when the washing machine is idle. For this purpose, the motor is provided with a double pivot mounting permitting the motor to be bodily shifted, upon reversal of rotation of motor drive shaft, to either of two predetermined positions in which a constant automatic and proper tension is placed on the belt by virtue of the belt tension being automatically compensated in direct proportion to the motor load. More particularly, the motor body 22 is supported on an annular bracket support plate 23, the central circular opening 24 of which is adapted to receive the hub 25 of the motor in spaced relation to the plate 23, as clearly shown in FIG. 4. The motor is mounted on the plate 23 by four posts or bushings 26 as shown in FIG. 5 wherein it is seen that respective of the four bosses 27, forming an integral part of the casing of the motor body, is received within an upper cylindrical opening 28 in the bushing 26 with the upper circular edge of the bushing engaging the motor body, the bottom of the bushing 26 being seated on the plate 23. To securely connect the motor with the plate 23, a conventional motor casing assembly bolt 29 extends into and through a lower cylindrical opening 30 in the bushing 26 and the projecting lower portion of the bolt is provided with a nut 32 and a washer 33 in the opening 28 in the bushing 26 and disposed between the end of the motor boss and a shoulder 34 of the bushing 26 defining adjoining terminals of the openings 28 and 30 of the bushing. The lower end of the bolt extends outwardly beyond the plate 23 for receiving a nut 35 to securely fasten the plate to the motor. The plate 23 and thereby the motor M are mounted upon a bracket or plate 36 having an upwardly extending wall 37 terminating in a flange 38 which may be welded or otherwise securely fastened to the laterally extending flange 39 of the channel member 11 as shown in FIG. 4, the opposite edge of the plate 36 terminating in a downwardly extending flange 40 received within and firmly secured to a supporting channel member 41 extending parallel to the support member 11 and forming a part of the supporting structure H.

The motor M and plate 23 are mounted on the plate 36 for unitary pivotal movement in a manner that will now be described. More particularly, the plate 36 is provided with two arcuately shaped cam slots 42 and 43 with their concave curvatures in generally facing relation and converging toward and having adjacent ends terminating in a slot 44 through which the motor drive shaft 19 extends. The cam slots 42 and 43 are adapted to receive spaced cam elements indicated generally at 45 and 46 which also serve to support the plate 23 and motor M for pivotal movement on the bracket 36. The structure of the cam elements 45 and 46 are shown in FIGS. 4 and 6 and, as these elements are identical, the element 45 will only be described. The cam element 45 comprises an annular nylon bushing 47 having a circular groove 48 receiving the spaced arcuate edges of the cam slot 42. Disposed between the bracket 23 and the bushing 47 is an annular rubber grommet 49. Another rubber grommet 50 is provided having diametrically smaller and larger portions with the diametrically smaller portion being received within the bushing 47 and engaging the bottom of the grommet 49 and the diametrically larger portion extending beneath and engaging the bushing 47. The described parts of the cam element 45 are securely connected to the plate 23 by a bolt and nut assembly, the bolt 51 extending through an opening in the plate 23 and downwardly through a cylindrical spacer 52 positioned within the openings in the grommet 49 and 50 and having its downwardly and outwardly extending end in threaded engagement with a nut 53 engaging a washer 54 seated against the bottom of the rubber grommet 50. While the cam element 45 has been specifically described with reference to the cam slot 42, it is to be understood that the cam element 46 is identical in structure and cooperates with the arcuate cam slot 43.

The plate 23 and the rear portion of the motor M is additionally supported on the cam plate 36 by a foot structure secured to the plate 23 and slidable upon the plate 36 during pivotal movement of the motor in a manner which will be presently described. More particularly and referring to FIGS. 4 and 7, this foot structure comprises a rubber grommet 55 received within an opening in the plate 23 and disposed between the plate 36 and the base 56 of a nylon button 57. The button base 56 has sliding relation with the plate 36 and its upstanding shank portion 58 extends upwardly and through the opening in the annular grommet 55 with the enlarged head of the button being effective to distend a portion of the rubber grommet extending upwardly of the plate 23 to afford means for maintaining the grommet and button in assembly with the plate 23 during pivotal movement of the motor M and plate 23 relative to the plate 36.

It will be apparent from this description that the motor M and its mounting plate 23 are supported on the plate 36 and also that the motor M and its mounting plate 23 may be bodily and pivotally movable relative to the plate 36 to either the position shown in FIG. 3 or the position shown in FIG. 2, as controlled by the cam arrangement described, motor reversal, and the load on the motor by driving mechanism D and pump P. The cam slots 42 and 43 are geometrically designed and located in the cam plate 36 in a manner to afford a double pivot for the motor during bodily shifting movement of the motor during motor reversal to dispose the drive shaft and pulley of the motor in either the position shown in FIG. 2 or FIG. 3. Either of these pivotal movements of the motor to these positions are, of course, a combination of factors including the cam arrangement, the direction of rotation of the motor shaft, and the load imposed on the motor shaft and its pulley by the driving mechanism D and pump P. The geometrical layout of the cam slots are effective to cause proper and automatic tensioning of the belt 17 in either of the two motor positions shown in FIGS. 2 and 3 so that, while the axis of the motor shaft is displaced from one position to another position with respect to the axes of the driven shaft 10 and the pump driven shaft 21, all of these axes are maintained in a direct relation to each other to effect proper tensioning of the belt in either of the two positions of the motor shown in FIG. 2 and 3. While by proper relationship of the parts the cam elements 45 and 46 may engage the ends of their respective cam slots to maintain proper tensioning of the belt, it is preferred that the cam element 45 be maintained in spaced relation to the end of the cam slot 42 when the motor is in the position shown in FIG. 3 and, also when the motor is shown in its FIG. 2 position, the cam element 46 is spaced from the end of the slot 43 to ensure constant tension on the belt in the event the belt may stretch during use.

In order to permit free pivotal movement of the motor drive shaft 19 with respect to the cam plate 36, the slot 44, provided in the plate 36, is of such dimension as to provide ample clearance of the motor shaft during movement of the shaft from the position shown in FIG. 2 to the position shown in FIG. 3 and vice versa.

Concerning the double pivotal movement of the motor, and referring to FIG. 2, it will be seen that rotation of the pulley 18 in the direction indicated by the arrow will cause a load to be placed on the motor by the drive mechanism D through its drive shaft 10 and also by the pump P through its shaft 21 and which load is transmitted to belt 17 and thereby to the motor. The load on the motor and the tendency of its pulley to move downwardly along the belt provides a cumulative effect causing the motor to pivot about the cam elements 45 and 46 which are urged along the cam slots and guide the pivotal movement of the motor to its position shown in FIG. 2. Conversely, upon reversal of the motor rotation from the direction indicated by the arrow in FIG. 2 to the direction indicated by the arrow in FIG. 3, the load imposed upon the motor in the position shown in FIG. 2 will be effective to cause the motor to pivot to the position shown in FIG. 3. In either of the positions of the motor in FIGS. 2 and 3, this cumulative effect is operative to insure the proper and automatic tensioning of the belt, which is compensated in direct proportion to the motor load.

If desired, a very light torsion spring 82 may be employed to maintain the belt 17 snugly in engagement with the drive pulley 18 to provide for a more effective driving relationship and also to prevent disengagement of the belt from the pulley 18 in the relaxed condition of the belt. More particularly, the spring has one end connected as at 83 to the edge of the plate 23 approximately midway between the upper and lower sides of the plate 23 (FIG. 3) and has its other end hooked as at 84 to the bottom of the V-shaped notch 85 located between the cam slots 42 and 43 in the plate. This location of the spring provides an overcenter arrangement in which the spring is operative to bias the plate 23 and motor M to either of two positions in which the belt snugly engages the drive pulley during drive and insures engagement of the belt with the drive pulley when the motor is idle.

A further feature of my improved drive assembly is that, when the machine is idle, the belt may be readily removed from the pulleys by movement of the motor shaft 19 within the slot 44 to a position intermediate the slots 42 and 43 for relaxing the tension on the belt. This belt movement is automatically achieved as any tension in the belt will cause the motor to pivot to the described position to relieve all tension on the belt. This feature is advantageous as the bearings for the motor drive shaft and the drive mechanism and pump shafts are completely unloaded when the machine is idle.

In the event it is necessary to remove the motor from the washing machine for servicing or replacement, the motor can be readily removed and replaced in the washing machine as it is merely necessary to remove the four nuts 35 of the bolt and nut assemblies securing the motor to the plate 23 whereupon the motor may be detached from the plate 23 and removed from the washing machine and subsequently, upon attachment of the motor to the washing machine, the four bolts 29 connected to the motor, may be positioned in the openings provided for the bolts in the plate 23 whereupon the motor may again be securely fastened to the plate 23 by the application of the nuts 35 to the bolts 29.

FIGS. 8, 9 and 10 illustrate another embodiment of my improved drive assembly and functioning in an identical manner to that of the preferred embodiment of the drive assembly shown in FIGS. 1 to 7. In FIGS. 8, 9, and 10, like reference letters and numerals are used to designate similar parts of the washing machine structure shown in FIGS. 1 to 7 inclusive. In this embodiment of the invention, the motor is supported and pivotally mounted by the structure generally designated by the letter V and comprising a plate 61 having an upwardly extending wall 62 (FIG. 10) terminating in a laterally extending flange 63 secured as by welding to a flange of the frame member 11 with the opposite side edge of the plate 61 underlying and being secured to a horizontally extending upper flange of the frame member 41 and whereby the plate 61 is secured to the members 11 and 41 of the frame support members. The motor M is supported on the plate 61 in a manner as will now be described to position its bearing portion 25 for the drive shaft 19 in an annular opening 64 of the plate 61 so that the drive shaft 19 is disposed in a vertical position as shown in FIG. 10.

The motor M is mounted on a plate 65 by assemblies including four bolts 66 extending downwardly therefrom and through openings in the plate 65 and, as shown in FIG. 10, each assembly comprises a motor casing bolt 66 extending through a bushing 67 positioned within the opening of a rubber grommet 68 connected to the plate 65, the bolt having its downwardly extending threaded end in engagement with a nut 69. The grommet 68 is disposed within an opening in the plate 65 and the circular edge defining this opening extends within an annular groove 70 in the grommet so that the motor is resiliently mounted and supported on the plate 65. The plate 65 and motor M are supported on the plate 61 and for unitary pivotal movement by two cam elements respectively and generally designated 71 and 72. The cam element 71 comprises a nylon grommet 73 positioned between and engaging the plate 65 and a boss 74 of the plate 61, as shown more particularly in FIG. 10. The grommet 73 is securely fastened to the plate 61 by a bolt and nut assembly, the bolt 75 extending through a grommet 76 having a reduced portion 77 slidably disposed within an arcuate cam slot 78 in the plate 65 and engaging the upper end of the bushing 73, the bolt also extending through the aligned openings in the bushing 73 and the boss 74 of the plate 61 and having threaded engagement with a nut 75a. The cam element 72 is formed identically to the cam element 71 but is slidably disposed within an arcuate slot 79 in the plate 65.

The motor M and plate 65 are further supported on the plate 61 by means of a foot in the form of a cylindrical block 80 of nylon having its bottom end in sliding engagement with the plate 61 and its upper end provided with a reduced portion 82 extending upwardly through an opening in the plate 65. It will be apparent from an inspection of FIGS. 8, 9, and 10, that the arcuate slots 78 and 79 connect the motor M and plate 65 for pivotal movement as a unit relative to the plate 61 by virtue of the cooperation between the stationary elements 71 and 72 and the cam slots 78 and 79, the cam slots permitting the motor and plate 65 to pivot relative to the cam elements 71 and 72 during reversal of rotation of the motor drive shaft 19. The geometrical relation of the slots 78 and 79 with respect to each other and the cam elements 71 and 72 are such as to cause the motor to pivot and, in either position of the motor in FIGS. 8 and 9, to provide for the automatic and proper tensioning of the belt 17. Referring to FIG. 8, it will be apparent that, when the pulley 18 is rotated by the motor drive shaft in the direction opposite to that indicated by the arrow by motor reversal, and there is loading of the belt 17 by the drive mechanism D and the pump P, the motor will pivotally move from the position shown in FIG. 8 to the position in FIG. 9 and maintain this latter position. Similarly, upon reversal of the direction of rotation of the motor in FIG. 9 to the direction indicated in FIG. 8, the load placed upon the belt by the driving mechanism D and the pump P will cause the motor to pivot from the position shown in FIG. 9 to that shown in FIG. 8. In each of these positions, the belt tension will be automatically compensated for in direct proportion to the motor load so that, should the load be partially removed, for example, by operation of the driving mechanism D for any cycle of operation of the washing machine, decreased loading will affect the belt tension by somewhat releasing the driving effort of the belt 17 with consequent pivotal movement of the motor to continue to drive the belt at the proper belt tension. Similarly to the embodiment of the invention shown in FIGS. 1 to 7 inclusive, it will be apparent that, when the machine is idle and no load is imposed upon the motor, tension on the belt will be released so that all bearings of the drive mechanism and pump driven shafts and the motor drive shaft will be relieved of side thrust with consequent extended life of the bearings. The drive assembly may also be provided, if desired, with a spring 86 having one end secured as at 87 an edge of the plate 65 and with its other end hooked over and secured as at 88 to the circular edge of the annular opening 64 of the plate 61 to provide an overcenter spring arrangement effective to maintain the belt snugly engaged with the drive pulley, and also to prevent the belt from dropping off the pulley in the relaxed condition of the belt. The motor may be readily removed from the washing machine by removal of the nuts 69 whereupon the motor may be removed for a servicing or replacement and, subsequently, in assembly of the motor and the plate 65, the motor may be readily mounted on the washing machine by disposing the bolts 66 within openings in the plate 65 and then utilizing the nuts 69 for securing the motor to the plate 65. In the removal and replacement of the motor with respect to the machine, it will be apparent that, as all of the tension on the belt is released, the belt may be readily displaced from and connected to the pulleys. In the embodiment of the invention illustrated in FIGS. 8 to 10, it will be noted that the arcuate slots 78 and 79 have such length that when the motor is disposed in either of the drive positions of FIGS. 8 and 9, the cam elements cannot engage the adjacent end of the slots so that there may be a constant fluctuating pivotal movement of the motor to automatically compensate belt tension in direct proportion to the motor load.

While certain preferred embodiments of the invention have been illustrated and described, many modifications may be made without departing from the spirit of the invention and, accordingly, the invention is not to be limited to the precise details of construction set forth but the latitude of such changes and modifications shall be governed by the breadth and scope of the language contained in the appended claims.

What is claimed is:

1. In a reversible drive assembly including a drive pulley and a plurality of driven pulleys, said drive pulley and said driven pulleys being spaced apart and having parallel axes of rotation, a belt interconnecting said pulleys for conjoint rotation, means for loading at least one of said driven pulleys, and a power unit having a reversible drive shaft connected to said drive pulley, the improvement residing in means for supporting said power unit with said drive shaft vertically disposed and for pivotal bodily shifting movement of said power unit relative to said driven pulleys to either of two predetermined positions during, and dependent on, the reversal of the direction of rotation of said drive shaft and being operative in either of said positions of said power unit to tension said belt in proportion to the load on said power unit.

2. In a reversible drive assembly including a drive pulley and a plurality of driven pulleys, said drive pulley and said driven pulleys being spaced apart and having parallel axes of rotation, a belt interconnecting said pulleys for conjoint rotation, means for loading at least one of said driven pulleys, and a power unit having a reversible drive shaft connected to said drive pulley, the improvement residing in means for pivotally supporting said power unit with said drive shaft vertically disposed and including means for controlling pivotal bodily shifting movement of said power unit relative to said driven pulleys to either of two predetermined positions during, and dependent on, the reversal of the direction of rotation of the drive shaft and being operative in either of said positions of said power unit to tension said belt in proportion to the load on said power unit.

3. In a reversible drive assembly including a drive pulley and a plurality of driven pulleys, said drive pulley and said driven pulleys being spaced apart and having parallel axes of rotation, a belt interconnecting said pulleys for conjoint rotation, means for loading at least one of said driven pulleys, and a power unit having a reversible drive shaft connected to said drive pulley, the improvement residing in means for supporting said power unit with said drive shaft vertically disposed and including spaced pivot means for pivotal movement of said power unit in a horizontal plane, and means for controlling bodily shifting movement of said power unit about said pivot means and relative to said driven pulleys to either of two predetermined positions during, and dependent on, the reversal of the direction of rotation of the drive shaft and being operative in either of said positions of said power unit to tension said belt in proportion to the load on said power unit.

4. In a reversible drive assembly including a drive pulley and a plurality of driven pulleys, said drive pulley and said driven pulleys being spaced apart and having parallel axes of rotation, a belt interconnecting said pulleys for conjoint rotation, means for loading at least one of said driven pulleys, and a power unit having a reversible drive shaft connected to said drive pulley, the improvement residing in means for pivotally supporting said power unit and including cam means controlling pivotal bodily shifting movement of said power unit in a horizontal plane relative to said driven pulleys to either of two predetermined positions during, and dependent on, the reversal of direction of rotation of drive shaft and being operative in either of said positions of said power unit to tension said belt in proportion to the load on said power unit.

5. In a reversible drive assembly including a drive pulley and a plurality of driven pulleys, said drive pulley and said driven pulleys being spaced apart and having parallel axes of rotation, a belt interconnecting said pulleys for conjoint rotation, means for loading at least one of said driven pulleys, and a power unit having a reversible drive shaft connected to said drive pulley, the improvement residing in means for supporting said power unit including spaced pivot means, and cam means for controlling bodily shifting movement of said power unit about and with both of said pivot means and relative to said driven pulleys to either of two predetermined positions during, and dependent on, the reversal of the direction of rotation of the drive shaft and being operative in either of said positions of said power unit to tension said belt in proportion to the load on said power unit.

6. In a reversible drive assembly including a frame;

a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, and means connecting said frame and support members including spaced pivot means on one of said members, and cam means on the other of said members provided by spaced arcuate tracks respectively receiving said pivot means for controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in proportion to the load on said power unit.

7. In a reversible drive assembly including a frame; a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, means connecting said frame and support members including spaced pivot means on said support member, and cam means on said frame member provided by spaced arcuate tracks respectively receiving said pivot means for controlling pivotal bodily shifting movement of said pivot means and thereby said support member and power unit relative to said driven pulleys to either of two predetermined positions during, and dependent on, the reversal of the direction of rotation of the drive shaft and being operative in either of said positions of said power unit to tension said belt in proportion to the load on said power unit.

8. In a reversible drive assembly including a frame; a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, means connecting said frame and support members including spaced pivot means on said frame member, and cam means on said support member provided by spaced arcuate tracks respectively receiving said pivot means for controlling pivotal bodily shifting movement of said support member and thereby said cam tracks and power unit relative to said driven pulleys to either of two predetermined positions during, and dependent on, the reversal of the direction of rotation of the drive shaft and being operative in either of said positions of said power unit to tension said belt in proportion to the load on said power unit.

9. In a reversible drive assembly including a frame; a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, means connecting said frame and support members including spaced pivot means on one of said members, and cam means on the other of said members provided by spaced arcuate tracks having confronting non-concentric concave curvatures, respectively receiving said pivot means and controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in proportion to the load on said power unit.

10. In a reversible drive assembly including a frame; a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, said members having aligned openings through which said drive shaft extends, means mounting said support member on said frame member and including spaced pivot means on one of said members, and cam means on the other of said members provided by spaced arcuate tracks, having confronting non-concentric concave curvatures, respectively receiving said pivot means and controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in direct proportion to the load on said power unit, said tracks being provided by slots in said other member, and said pivot means having grooves receiving the edges of said slots for sliding engagement of said pivot means with said slot edges and for supporting said support member and said power unit on said frame member.

11. In a reversible drive assembly including a frame; a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit and including a foot portion in sliding engagement with said frame member, said support and frame members having aligned openings and said power unit being positioned on said support member to vertically dispose said drive shaft and to extend downwardly from said power unit through said openings, means connecting said frame and support members including spaced pivots on one of said members, and non-concentric arcuate slots on the other of said members and converging toward said drive shaft and respectively receiving said pivots for supporting said support member and thereby said power unit on said frame member and for controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in proportion to the load on said power unit.

12. In a reversible drive assembly including a frame; a drive pulley and a plurality of driven pulleys, said drive pulley and said driven pulleys being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, and means connecting said frame and support members including spaced pivot means on one of said members, respectively received within spaced non-concentric and confronting concave arcuate tracks in the other of said members for controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in proportion to the load on said power unit, said members having aligned openings receiving said drive shaft to accommodate pivotal movement of said drive shaft and said pivot means and tracks being located and arranged generally between said drive shaft pulley and said driven pulleys to permit tension of the belt to pivotally move the power unit and its drive shaft in one of said openings, upon deenergization of said power unit, to a position, with respect to the driven pulleys, in which tension is completely removed from the belt.

13. In a reversible drive assembly including a frame; a drive pulley and a plurality of driven pulleys, said drive pulley and said driven pulley being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, and means connecting said frame and support members including spaced pivot means on one of said members respectively received within spaced non-concentric arcuate tracks in the other of said members for controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in proportion to the load on said power unit, and, upon deenergization of said power unit, to permit tension of the belt to pivotally move the power unit and its drive shaft to a position in which tension is completely removed from the belt.

14. In a reversible drive assembly including a frame; a drive pulley and a plurality of driven pulleys, said drive pulley and said driven pulley being spaced apart and having parallel axes of rotation, said driven pulleys being journaled on said frame; a belt interconnecting said pulleys for conjoint rotation; means for loading at least one of said driven pulleys; and a power unit having a reversible drive shaft connected to said drive pulley, the improvement residing in means for mounting said power unit on said frame including a frame member, a support member secured to said power unit, and means connecting said frame and support members including spaced pivot means on said support member respectively received within spaced non-concentric and confronting concave arcuate tracks in the said support member converging toward an opening in said support member receiving said drive shaft and being operative for controlling pivotal bodily shifting movement of said support member and power unit relative to said driven pulleys to either of two predetermined positions during, and dependent on, the reversal of the direction of rotation of the drive shaft and being operative in either of said positions of said power unit to tension said belt in proportion to the load on said power unit, said pivot means and tracks being located and arranged to permit tension of the belt to pivotally move the power unit and its drive shaft in said opening in said support member, upon deenergization of said power unit, to a generally central position between the convergent ends of the tracks to completely remove tension on the belt.

References Cited in the file of this patent

UNITED STATES PATENTS

| | | |
|---|---|---|
| 1,985,022 | De Bothezat | Dec. 18, 1934 |
| 2,102,560 | Kimmich | Dec. 14, 1937 |
| 2,731,222 | Poeschl et al. | Jan. 17, 1956 |

FOREIGN PATENTS

| | | |
|---|---|---|
| 111,895 | Australia | Nov. 21, 1940 |